United States Patent
Miyamoto et al.

(10) Patent No.: US 9,860,019 B2
(45) Date of Patent: Jan. 2, 2018

(54) BASE STATION APPARATUS, WIRELESS COMMUNICATION SYSTEM, AND COMMUNICATION METHOD

(71) Applicant: NIPPON TELEGRAPH AND TELEPHONE CORPORATION, Tokyo (JP)

(72) Inventors: Kenji Miyamoto, Yokosuka (JP); Shigeru Kuwano, Yokosuka (JP); Jun Terada, Yokosuka (JP); Takayoshi Tashiro, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 0 days.

(21) Appl. No.: 15/116,126

(22) PCT Filed: Jan. 29, 2015

(86) PCT No.: PCT/JP2015/052477
§ 371 (c)(1),
(2) Date: Aug. 2, 2016

(87) PCT Pub. No.: WO2015/119031
PCT Pub. Date: Aug. 13, 2015

(65) Prior Publication Data
US 2017/0180078 A1    Jun. 22, 2017

(30) Foreign Application Priority Data

Feb. 6, 2014  (JP) .................................. 2014-021155

(51) Int. Cl.
*H04L 1/00* (2006.01)
*H04L 25/02* (2006.01)
(Continued)

(52) U.S. Cl.
CPC ........... *H04L 1/0054* (2013.01); *H04B 7/022* (2013.01); *H04L 25/024* (2013.01); *H04L 25/03292* (2013.01); *H04W 88/085* (2013.01)

(58) Field of Classification Search
CPC ................. H04L 1/0054; H04L 25/024; H04L 25/03292; H04B 7/022; H04W 88/085
See application file for complete search history.

(56) References Cited

U.S. PATENT DOCUMENTS

2003/0026222 A1*  2/2003  Kotzin ................... H04B 7/026
                                                        370/335
2003/0171118 A1   9/2003  Miya
(Continued)

FOREIGN PATENT DOCUMENTS

JP    2003-037537 A    2/2003
JP    2012-178727 A    9/2012
(Continued)

OTHER PUBLICATIONS

Dajie Jiang et al., "Uplink Coordinated Multi-Point Reception for LTE-Advanced Systems", Wireless Communications, Networking and Mobile Computing, 2009, pp. 24-26.
(Continued)

*Primary Examiner* — Vineeta Panwalkar
(74) *Attorney, Agent, or Firm* — Harness, Dickey & Pierce, P.L.C.

(57) ABSTRACT

A base station apparatus includes at least one remote unit apparatus including at least one antenna; and a central unit apparatus connected to each remote unit via a transmission path. The remote antenna receives a wireless transmission signal from at least one wireless terminal including at least one antenna. The remote unit includes a channel estimation unit functioning between the terminal antenna and the remote antenna, using a reception signal received by the remote unit antenna; a reception signal processing unit that
(Continued)

detects a reception signal corresponding to the transmission signal, using the channel information estimated by the channel estimation unit; a decoding unit that decodes each signal detected by the reception signal processing unit; and an inter-unit transmission unit that transmits each signal decoded by the decoding unit to the central unit. The central unit is provided with an inter-unit receiving unit and a signal selection unit.

15 Claims, 10 Drawing Sheets

(51) Int. Cl.
*H04W 88/08* (2009.01)
*H04B 7/022* (2017.01)
*H04L 25/03* (2006.01)

(56) References Cited

U.S. PATENT DOCUMENTS

| | | |
|---|---|---|
| 2010/0067435 A1 | 3/2010 | Balachandran et al. |
| 2010/0098014 A1 | 4/2010 | Larsson |
| 2012/0108243 A1 | 5/2012 | Yahagi |
| 2012/0243513 A1 | 9/2012 | Fujishima et al. |
| 2012/0307765 A1* | 12/2012 | Chakrabarti .......... H04W 16/14 370/329 |
| 2013/0329830 A1 | 12/2013 | Yokomakura et al. |

FOREIGN PATENT DOCUMENTS

| | | |
|---|---|---|
| JP | 2012-204974 A | 10/2012 |
| WO | WO-2006/070478 A1 | 7/2006 |

OTHER PUBLICATIONS

K. Higuchi et al., "Multi-Antenna Wireless Transmission Technique, Part 3, Signal detection Technique in MIMO Multiplexing Method", NTT DoCoMo Technical Journal, vol. 14, No. 1, pp. 66-75, Jul. 2012, with partial translation.

Y. Tanabe et al., "MIMO Receiving Algorithms Appropriate to System Requirements", Toshiba Review, vol. 61, No. 4, pp. 40-43 (2006) with partial translation.

K. Higuchi et al.,"Special Topic, Broadband Packet Wireless Access 1 Gbit/s PacketSignal Transmission Experiment, Experiment Apparatuses and Summary ofTechnique", NTT DoCoMo Technical Journal, vol. 13, No. 2, pp. 6-15, Sep. 2011, with partial translation.

Song-Nam Hong et al., Compute-and-Forward Strategies for Cooperative Distributed Antenna Systems, IEEE Transactions on Information Theory, vol. 59, No. 9, IEEE, Sep. 30, 2013, pp. 5227-5243.

International Search Report for PCT/JP2015/052477, ISA/JP, dated Mar. 10, 2015.

Extended European Search Report for EP Application No. 15746196.3 dated Sep. 6, 2017.

* cited by examiner

PRIOR ART

BASE STATION APPARATUS, WIRELESS COMMUNICATION SYSTEM, AND COMMUNICATION METHOD

CROSS-REFERENCE TO RELATED APPLICATIONS

This application is a 371 U.S. National Stage of International Application No. PCT/JP 2015/052477, filed Jan. 29,2015, which claims the benefit of and priority to Japanese Patent Application No. 2014-021155, filed on Feb. 6, 2014.The entire disclosures of the above applications are incorporated herein by reference.

TECHNICAL FIELD

A configuration in a wireless communication system in which a plurality of antenna units equipped with part of functions of a base station are physically stretched out, and are used as remote units is being studied. The present invention relates to a communication scheme between a plurality of remote units and a central unit that controls them.

BACKGROUND ART

A configuration in a wireless communication system, particularly, in a mobile communication system, in which a plurality of antenna units equipped with part of functions of a base station are physically stretched out and are used as remote units is being studied. Here, an antenna unit refers to a unit that is equipped with a transmission interface, a wireless transceiver, and an antenna. A base station with a plurality of remote units stretched out therefrom functions as a central unit to control the remote units. In the communication scheme for performing communication between the central unit and the remote units, two system configurations which differ from each other in terms of distribution of functions between the central unit and the remote units are being studied.

One of them is referred to as full centralization. As shown in FIG. 1, in this system configuration, a central unit 10 is equipped with functions of a physical layer excluding antenna units and functions of a data link layer and higher layers, and remote units 20 each equipped only with an antenna unit are stretched out. The other is referred to as partial centralization. As shown in FIG. 2, in this system configuration, a central unit 10 is equipped with functions of a data link layer and higher layers, and remote units 20 each equipped with functions of a physical layer including an antenna unit are stretched out. Moreover, as shown in FIG. 3, a configuration in which part of the functions of the physical layer is left in the central unit 10 in the configuration of the partial centralization is also being studied.

Today, the more widely used system configuration is full centralization. The communication scheme between the central unit 10 and the remote units 20 in this configuration uses a digital radio over fiber (RoF) technique as typified by a common public radio interface (CPRI).

On the other hand, in a mobile communication system, an area covered by a single base station is referred to as cell, and there is a problem of a phenomenon in which when a mobile station reaches the edge region of a cell, wireless signals being transmitted from a desired base station interfere with wireless signals being transmitted from an adjacent base station, resulting in a significant reduction in transmission rate between the base station and the mobile station. As a means for solving the problem of such interference between the signals from the cells, as shown in FIG. 4 and FIG. 5, a coordinated multi-point transmission/reception (CoMP) technique in which adjacent base stations (FIG. 4), a central unit 10 and a remote unit 20 (FIG. 5), or remote units 20 (FIG. 5) operate in cooperation with each other to communicate with a terminal 30 (mobile station) which is positioned at the edge of a cell 92 is being studied. It is to be noted that in FIG. 4 and FIG. 5, reference symbol 91 denotes a core network. Moreover, as one of the techniques for implementing the CoMP in uplink, there is a technique known as joint reception (JR), in which signals are received at different base stations to improve signal quality, and in this case, a plurality of base stations that receive signals in cooperation with each other may be seen as reception antennas for multiple-input multiple-output (MIMO) transmission. At this time, MIMO transmission when the number of terminals that transmit signals is one is referred to as single user (SU)-MIMO, and MIMO transmission when a plurality of terminals transmit signals simultaneously is referred to as multi user (MU)-MIMO (for example, refer to Non-Patent Document 1).

Examples of techniques for signal detection in MIMO transmission include: minimum mean square error (MMSE), in which signals are detected by means of a matrix operation with a reception weight matrix generated based on channel information estimated from reception signals; successive interference cancellation (SIC), in which signals are detected sequentially from higher quality signals; and maximum likelihood detection (MLD), which is also referred to as a maximum likelihood decision method, in which all combinations of transmission signals are compared with reception signals to perform discrimination (for example, refer to Non-Patent Document 2). In MLD, there are a receiving process that uses hard decision, and a receiving process that uses soft decision. In the hard decision, code words corresponding to estimated transmission signals are output as an output of the MLD, whereas in the soft determination, likelihood information of each bit of estimated transmission signals is output (for example, refer to Non-Patent Documents 3 and 4). Moreover, in the MLD process, the number of transmission signal vector candidates increases exponentially in accordance with the number of modulation levels and the number of transmission antennas. Therefore, techniques of reducing the amount of computation in the MLD process at each remote unit are being studied (for example, refer to Non-Patent Document 3).

FIG. 6 shows a signal transmission flow in the case of performing CoMP by means of JR on a full centralization system configuration. In FIG. 6, the number of remote units that operate in cooperation with each other is two, and a single antenna 21 is provided in each of these remote units 20. However, the number of remote units that operate in cooperation with each other need not be limited to two, and the number of antennas to be provided in each remote unit 20 may be more than one. Furthermore, in FIG. 6, the number of terminals that transmit signals is one, and the number of antennas of a terminal 30 is two. However, the number of terminals 30 that transmit signals may be more than one, and the number of antennas of the terminal need not be limited to two. Transmission signals $s_1$ and $s_2$ are transmitted from two antennas 31 of the terminal 30, and are received as reception signals $r_1$ and $r_2$ by the antennas 21 of a remote unit #1 and a remote unit #2, via a wireless transmission path expressed by a channel matrix H of elements $h_{ij}$ (i=1, 2, and j=1, 2). At this time, noises $n_1$ and $n_2$ are added to the reception signals during a reception process of RF signals in radio frequency (RF) receiving units 22. The relationship between these transmission signals, channel matrix, reception signals, and noises is expressed as Equation (1) below using vectors and matrices.

[Equation 1]

$$r = Hs + n \Leftrightarrow \begin{bmatrix} r_1 \\ r_2 \end{bmatrix} = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \quad (1)$$

The reception signals received by the remote units 20 undergo signal conversion such as conversion into CPRI signals, in signal conversion units 23, and they are then transmitted to the central unit 10. In the central unit 10, signal conversion units 11 perform signal conversion on the signals that have been transmitted, and a MIMO signal detection unit 13 performs a MIMO signal detection process based on the reception signals $r_1$ and $r_2$ received at the remote units 20. As a MIMO signal detection process, MLD is used, for example. When the transmission signals $s_1$ and $s_2$ have both been modulated by means of binary phase-shift keying (BPSK), in the MIMO signal detection by means of MLD, four transmission signal vector candidates $s_{c1}$, $s_{c2}$, $s_{c3}$, and $s_{c4}$ expressed as Equation (2) to Equation (5) below are multiplied by a channel matrix $H_e$, which has been estimated by means of channel estimation in a channel estimation unit 12 from the reception signals $r_1$ and $r_2$, to generate reception replicas $r_{c1}$, $r_{c2}$, $r_{c3}$, and $r_{c4}$ expressed as Equation (6) to Equation (9) below.

[Equation 2]

$$s_{c1} = \begin{bmatrix} e^{j0} \\ e^{j0} \end{bmatrix} \quad (2)$$

[Equation 3]

$$s_{c2} = \begin{bmatrix} e^{j0} \\ e^{j\pi} \end{bmatrix} \quad (3)$$

[Equation 4]

$$s_{c3} = \begin{bmatrix} e^{j\pi} \\ e^{j0} \end{bmatrix} \quad (4)$$

[Equation 5]

$$s_{c4} = \begin{bmatrix} e^{j\pi} \\ e^{j\pi} \end{bmatrix} \quad (5)$$

[Equation 6]

$$r_{c1} = H_e s_{c1} \quad (6)$$

[Equation 7]

$$r_{c2} = H_e s_{c2} \quad (7)$$

[Equation 8]

$$r_{c3} = H_e s_{c3} \quad (8)$$

[Equation 9]

$$r_{c4} = H_e s_{c4} \quad (9)$$

Squared Euclidean distances between the reception replicas and the reception signal r expressed as Equation (1) are calculated as Equation (10) to Equation (13) below, and the transmission signal vector candidate that corresponds to the reception replica with the minimum squared Euclidean distance is determined as an estimated transmission signal.

[Equation 10]

$$\|r - r_{c1}\|^2 \quad (10)$$

[Equation 11]

$$\|r - r_{c2}\|^2 \quad (11)$$

[Equation 12]

$$\|r - r_{c3}\|^2 \quad (12)$$

[Equation 13]

$$\|r - r_{c4}\|^2 \quad (13)$$

Finally, the determined transmission signals, after having been output as corresponding code words $c_1$ and $c_2$, undergo a decoding process in decoding units 14, and they are supplied to a media access control (MAC) function unit 15 of the data link layer as bit sequences $b_1$ and $b_2$. Here, after the signal conversion in the central unit 10, a process for receiving multi-carrier signals, such as those in orthogonal frequency division multiplexing (OFDM), may be performed on the reception signals. Moreover, transmission signal vector candidates do not always have to be limited to mapping on a complex plane as shown in Equation (2) to Equation (5), and another mapping may be performed. Furthermore, an MLD process such as the one described above is a receiving process that uses hard decision. However, a configuration which uses a receiving process that uses soft decision to output likelihood information may be employed. In this case, the output likelihood information is input to a soft input decoder such as a turbo decoder, undergoes a decoding process, and it is then output as a bit sequence.

However, in signal transmission in such a full centralization system configuration, signals obtained by performing sampling and quantization on the reception signals $r_1$ and $r_2$ are transmitted. Therefore, there is a problem in that the transmission capacity between the remote units and the central unit becomes extremely large. For example, when CPRI is used for signal transmission, if communications in a wireless section are performed at a transmission rate of 75 M bit per seconds (bps), the required transmission rate between the remote units and the central unit is 1,228 Mbps, which is approximately 16 times 75 Mbps.

On the other hand, FIG. 7 shows signal transmission when CoMP using JR is performed in a partial centralization system configuration, which, in comparison with a full centralization system configuration, can reduce the transmission capacity required between the central unit 10 and the remote units 20. As with FIG. 6, in FIG. 7, the number of remote units that operate in cooperation with each other need not be limited to two, and the number of antennas to be provided in a single remote unit 20 may be more than one. Moreover, the number of terminals 30 that transmit signals may be more than one, and the number of antennas of each terminal 30 need not be limited to two.

The decoding process, which is to be performed in the central unit 10 in full centralization, is performed in the decoding unit 26 of each remote unit. In partial centralization, in contrast with full centralization, data transmitted between the central unit 10 and the remote units 20 are bit sequences $b_1$ and $b_2$, which have undergone decoding. The data transmitted between the central unit 10 and the remote units 20 is not data of signals obtained by performing sampling and quantization on wireless signals, but is bit sequence data after decoding. Therefore, the transmission capacity between the central unit 10 and the remote units 20 becomes significantly small, compared with the case of full centralization. However, since the functions of the physical layer are distributed in partial centralization, there is a problem in that MIMO signal detection that uses reception signals $r_1$ and $r_2$ both as shown in FIG. 7, that is, CoMP, cannot be performed in the MIMO signal detection unit 25. Moreover, in the case of the configuration of FIG. 7, channel information that can be estimated by the channel estimation unit 24 of each remote unit 20 is $h_{e11}$ and $h_{e12}$ only at the remote unit #1, and it is $h_{e21}$ and $h_{e22}$ only at the remote unit #2. It is to be noted that after RF reception has been performed at a remote unit, a process for performing reception of multi-carrier signals such as those in OFDM on reception signals may be performed.

PRIOR ART DOCUMENTS

Non-Patent Documents

Non-Patent Document 1: "Uplink Coordinated Multi-Point Reception for LTE-Advanced Systems", Wireless Communications, Networking and Mobile Computing, 2009, pp. 24-26

Non-Patent Document 2: "Multi-Antenna Wireless Transmission Technique, Part 3, Signal detection Technique in MIMO Multiplexing Method", NTT DoCoMo Technical Journal, Vol. 14, No. 1, pp. 66-75

Non-Patent Document 3: "MIMO Receiving Algorithms Appropriate to System Requirements", Toshiba Review, Vol. 61, No. 4, pp. 40-43

Non-Patent Document 4: "Special Topic, Broadband Packet Wireless Access 1 Gbit/s Packet Signal Transmission Experiment, Experiment Apparatuses and Summary of Technique", NTT DoCoMo Technical Journal, Vol. 13, No. 2, pp. 6-15

SUMMARY OF INVENTION

Problems to be Solved by the Invention

In order to solve the above problems, an object of the present invention is to provide a base station apparatus, a wireless communication system, and a communication method, capable of performing uplink CoMP even with a partial centralization system configuration.

Means for Solving the Problems

In the present invention, in a partial centralization system configuration, MLD is performed in each remote unit using only a reception signal and channel information that can be acquired in each remote unit. Further, a central unit performs selection from signals collected from remote units based on propagation loss between antennas obtained from the channel information. Thereby, uplink CoMP can be realized even when functions of the physical layer are distributed.

Specifically, a base station apparatus according to the present invention is a base station apparatus including:

at least one remote unit apparatus comprising at least one antenna; and a central unit apparatus connected to the remote unit apparatus via a transmission path, wherein the antenna provided in the remote unit apparatus receives a transmission signal wirelessly transmitted from at least one wireless terminal each comprising at least one antenna, and the remote unit apparatus includes:

a channel estimation unit that estimates channel information between the antenna of the wireless terminal and the antenna of the remote unit apparatus, using a reception signal received by the antenna provided in the remote unit apparatus;

a reception signal processing unit that detects a reception signal corresponding to the transmission signal by performing maximum likelihood decision on the reception signal, using the channel information estimated by the channel estimation unit;

a decoding unit that decodes each signal detected by the reception signal processing unit; and an inter-unit transmission unit that transmits each signal decoded by the decoding unit to the central unit apparatus, and the central unit apparatus includes:

an inter-unit receiving unit that receives each signal transmitted from the inter-unit transmission unit; and a signal selection unit that acquires the channel information from the channel estimation unit, and selects a signal corresponding to each transmission signal transmitted from the wireless terminal, from among signals received by the inter-unit receiving unit, based on the acquired channel information.

In the base station apparatus according to the present invention, in the maximum likelihood decision, the reception signal processing unit may detect the reception signal using a hard decision output and output a code word corresponding to each transmission signal, and the decoding unit may decode each code word output from the reception signal processing unit into a bit sequence.

In the base station apparatus according to the present invention, in the maximum likelihood decision, the reception signal processing unit may detect the reception signal using a soft decision output and output log likelihood ratios of bits corresponding to each transmission signal, and the decoding unit may decode the log likelihood ratios output from the reception signal processing unit into a bit sequence.

In the base station apparatus according to the present invention, the signal selection unit may obtain each propagation loss between each antenna of the wireless terminal and each antenna of the base station apparatus based on the acquired channel information, and select a transmission signal with the minimum propagation loss from among common transmission signals as a reception signal that corresponds to the common transmission signal.

Specifically, a wireless communication system according to the present invention includes:

the base station apparatus according to the present invention; and the wireless terminal.

Specifically, a communication method according to the present invention is a communication method in a base station apparatus including: at least one remote unit apparatus comprising at least one antenna; and a central unit apparatus connected to each remote unit apparatus via a transmission path, the communication method including:

a channel estimation step in which, when each antenna of the remote unit apparatus receives each transmission signal that is wirelessly transmitted from at least one wireless terminal comprising at least one antenna, the remote unit apparatus uses a reception signal received by each antenna of the remote unit apparatus to estimate channel information between the antenna of the wireless terminal and the antenna of the base station apparatus;

a reception signal processing step in which the remote unit apparatus detects a reception signal corresponding to the transmission signal by performing maximum likelihood decision on the reception signal using the estimated channel information, and decodes each detected signal; and a signal selection step in which the central unit apparatus selects, from detected signals, a signal that corresponds to each transmission signal transmitted from the wireless terminal, using the estimated channel information.

In the communication method according to the present invention, in the reception signal processing step, as the maximum likelihood decision, the remote unit apparatus may detect a code word that corresponds to each transmission signal using a hard decision output, and decode each code word into a bit sequence.

In the communication method according to the present invention, in the reception signal processing step, as the maximum likelihood decision, the remote unit apparatus may detect log likelihood ratios of bits corresponding to each transmission signal using a soft decision output, and decode each log likelihood ratio into a bit sequence.

It is to be noted that the features above may be combined where possible.

Advantageous Effect of the Invention

It becomes possible to perform uplink CoMP by performing signal transmission between a central unit and remote units by means of partial centralization with the present invention applied thereto, rather than by means of full centralization which is widely used today.

MODES FOR CARRYING OUT THE INVENTION

Figure 1:
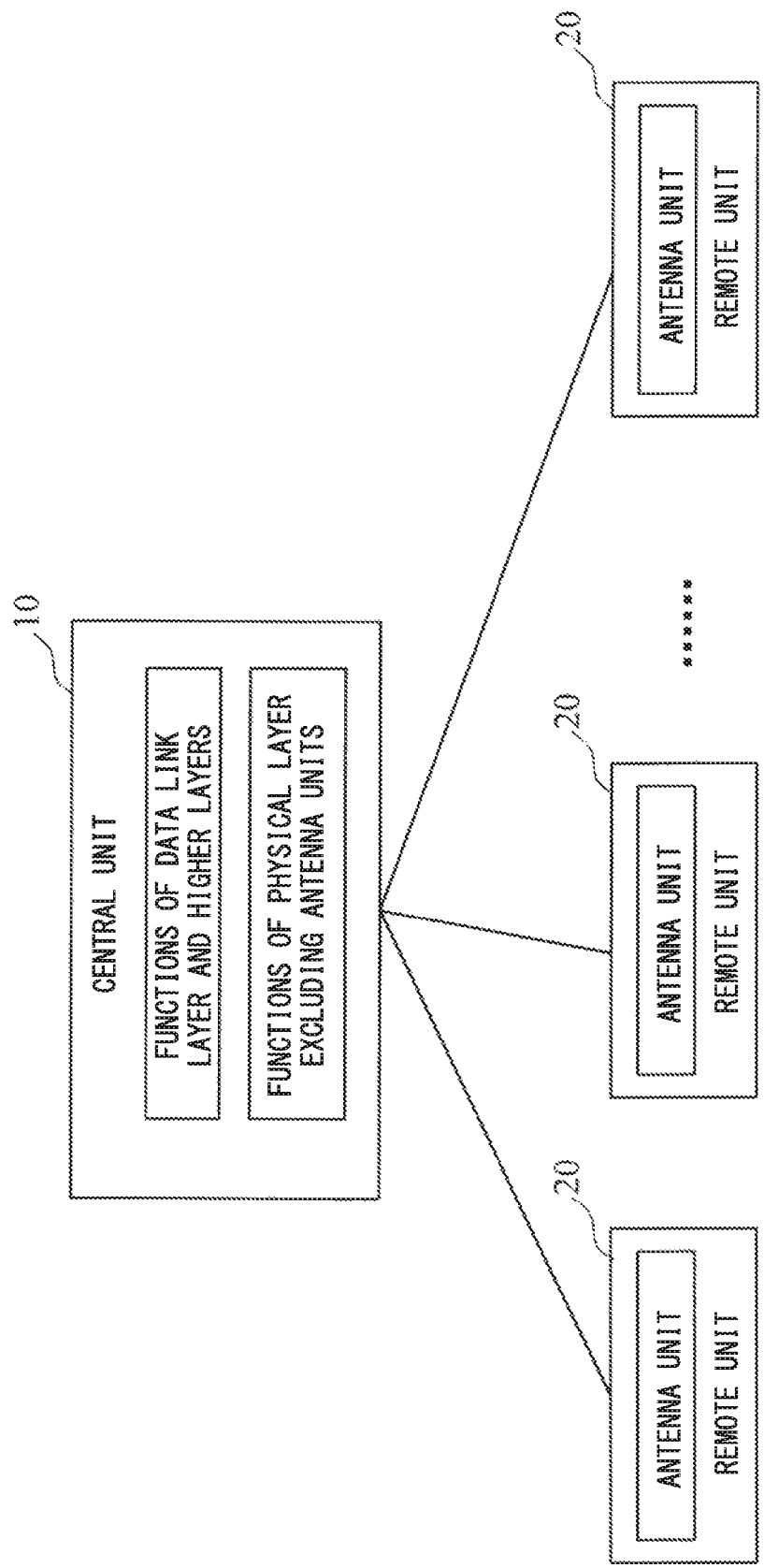
FIG. 1 shows a first example of a system configuration for performing communication between a central unit and remote units related to the present invention.
Figure 2:
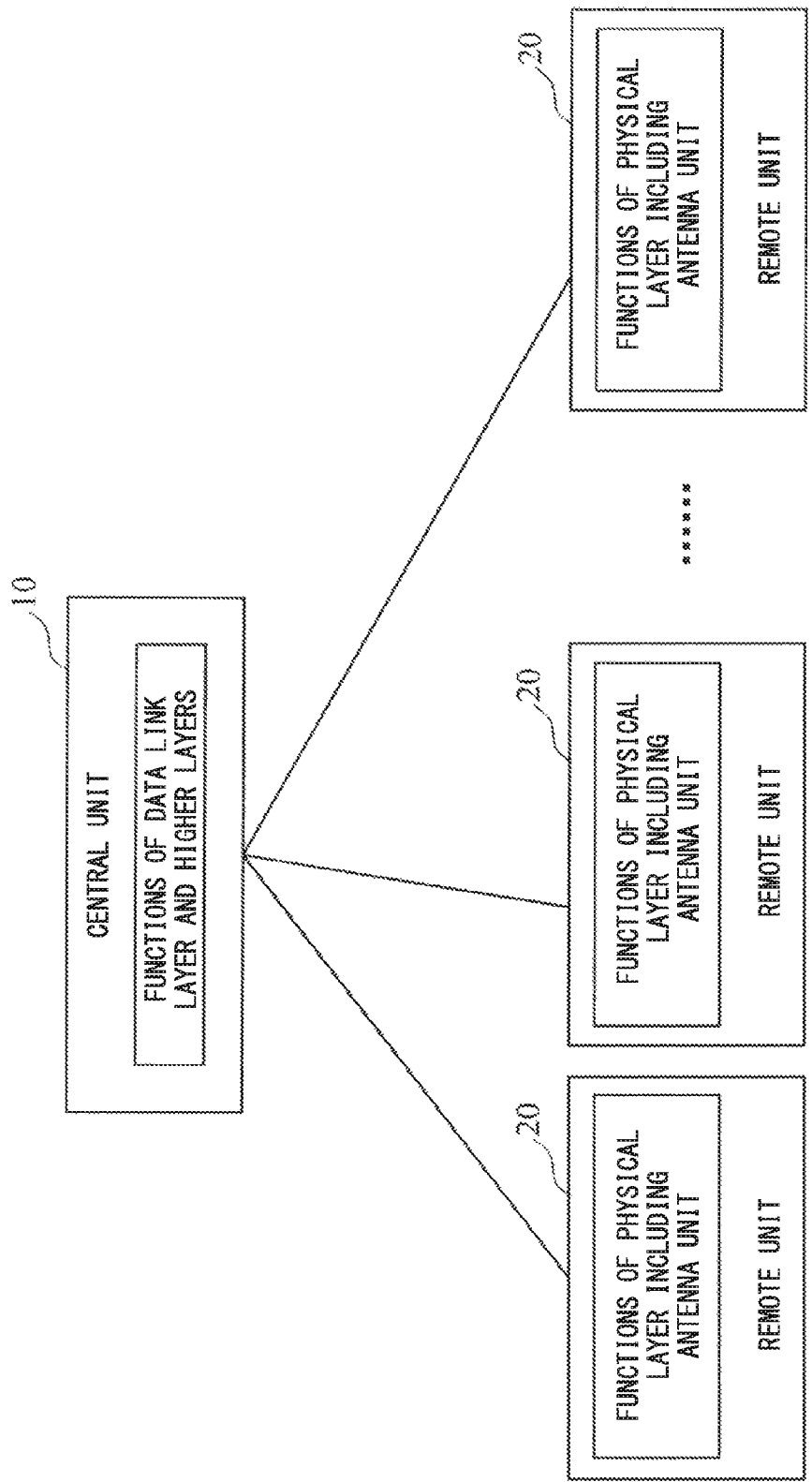
FIG. 2 shows a second example of a system configuration for performing communication between a central unit and remote units related to the present invention.
Figure 3:
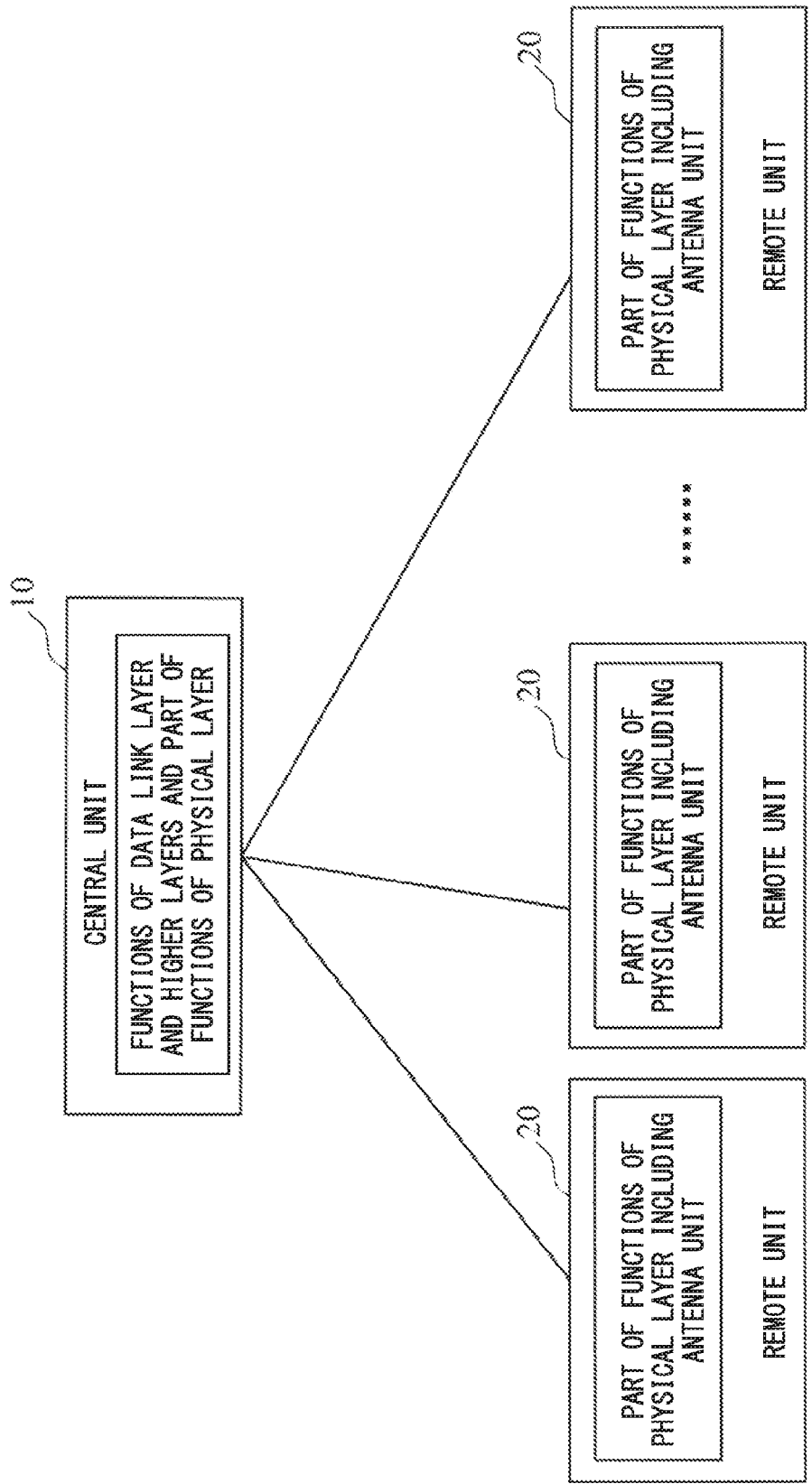
FIG. 3 shows a third example of a system configuration for performing communication between a central unit and remote units related to the present invention.
Figure 4:
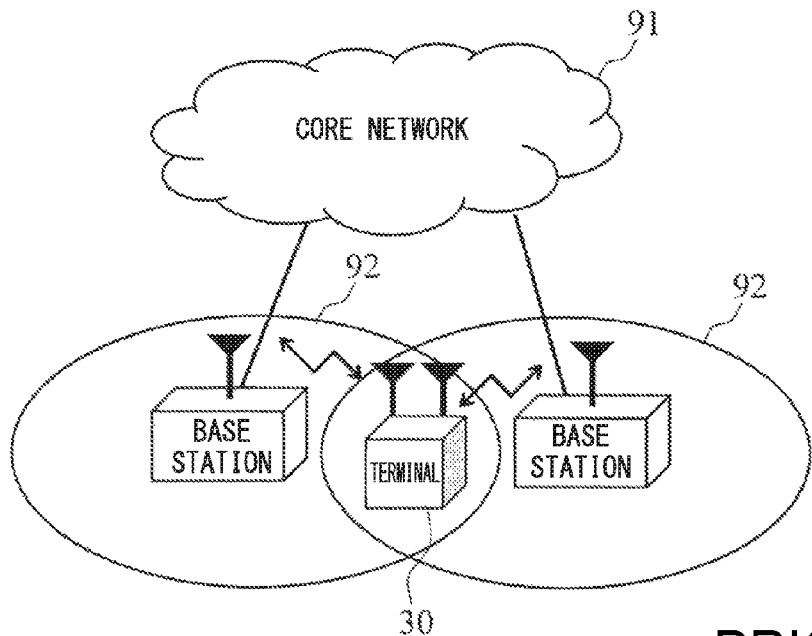
FIG. 4 shows an example of a technique of implementing CoMP when base stations operate in cooperation with each other.
Figure 5:
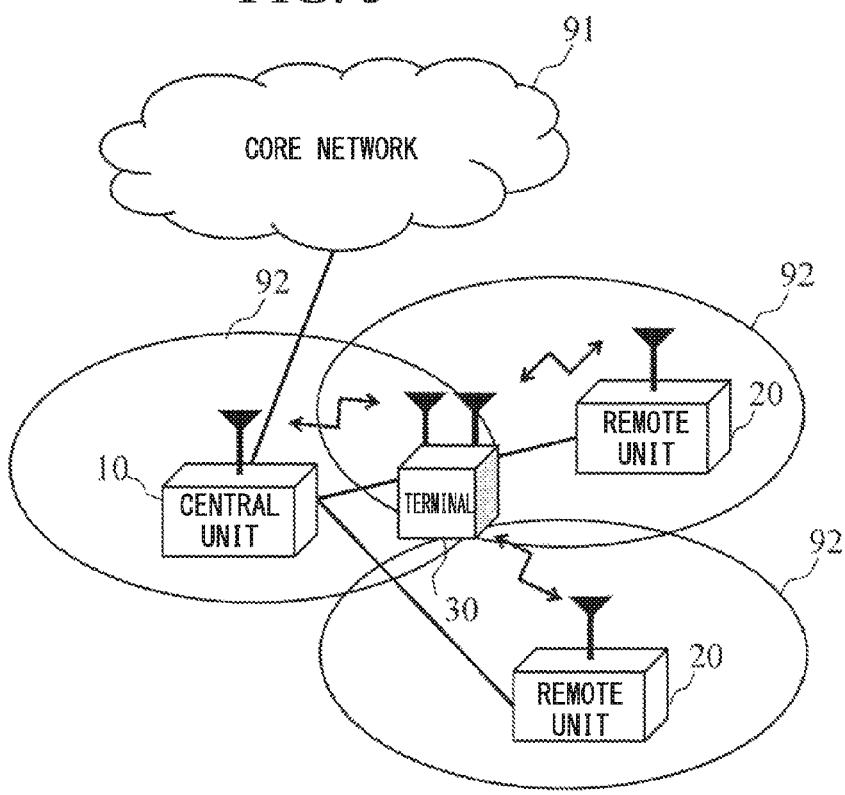
FIG. 5 shows an example of a technique of implementing CoMP when a central unit and remote units operate in cooperation with each other.
Figure 6:
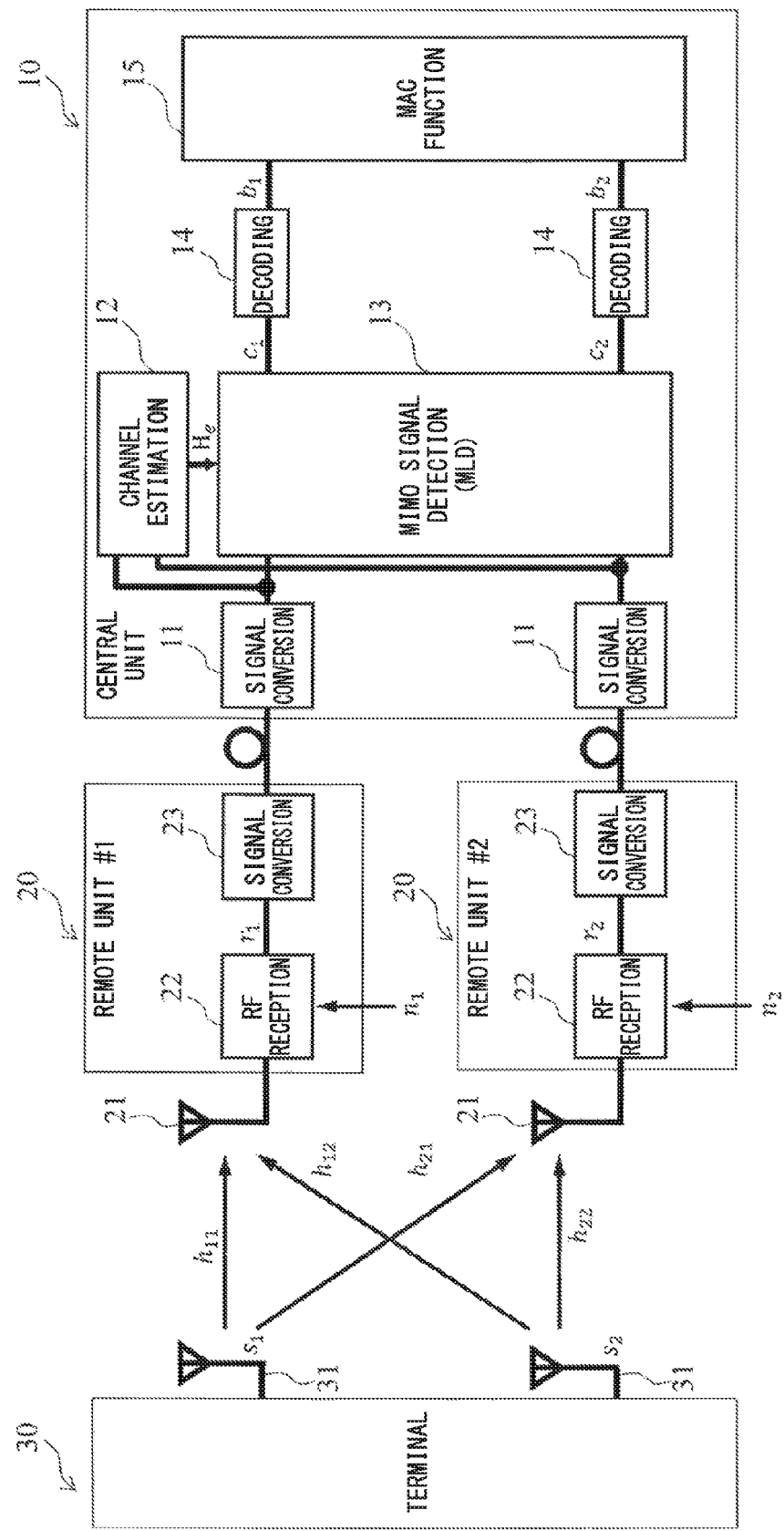
FIG. 6 shows an example of a system configuration for performing CoMP using JR in a full centralization system configuration.
Figure 7:
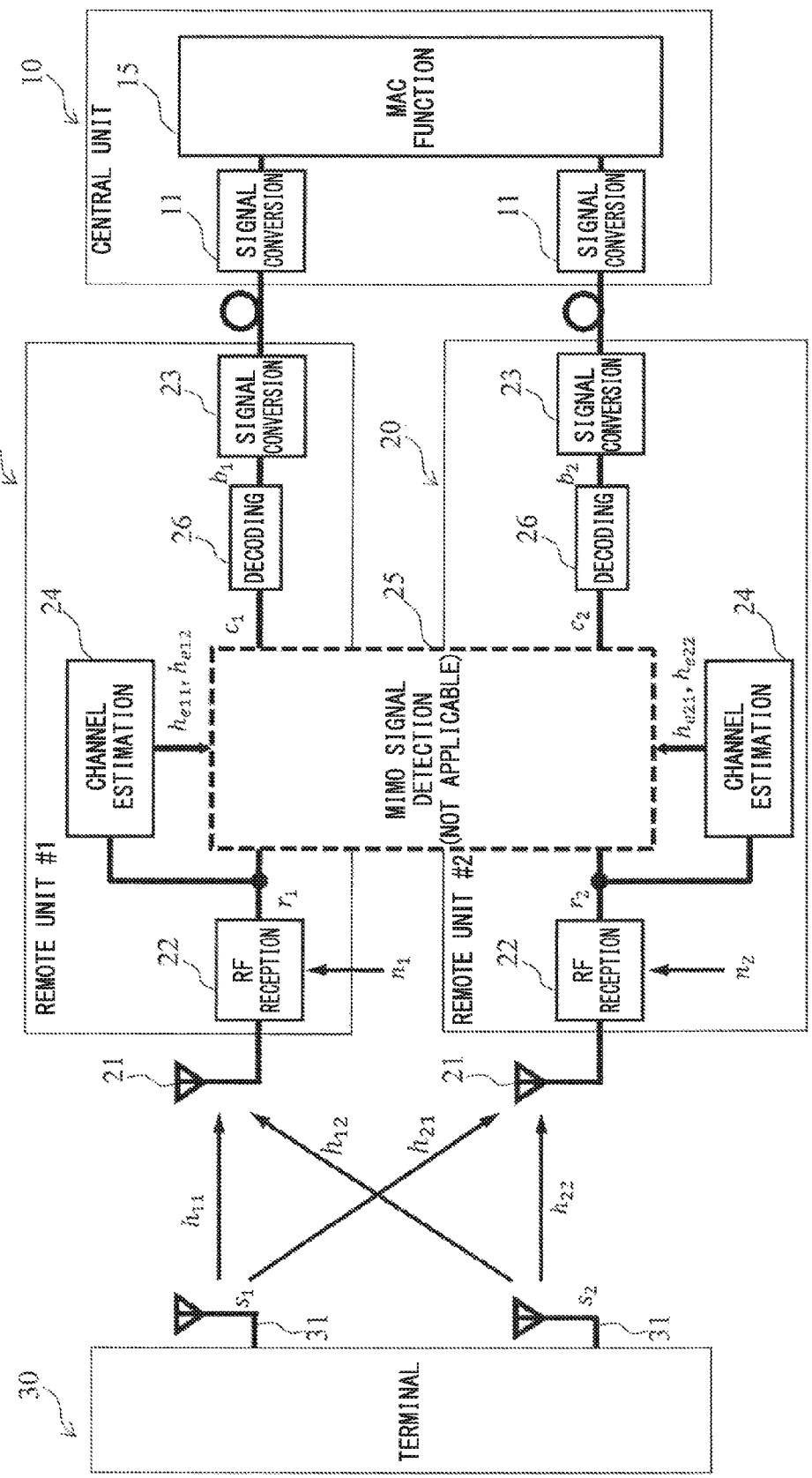
FIG. 7 shows an example of a system configuration for performing CoMP using JR in a partial centralization system configuration.

Hereunder, embodiments of the present invention will be described with reference to the drawings. It is to be noted that the present invention is not limited to the embodiments shown below. These embodiments are illustrated merely as examples, and various modifications and/or improvements may be made to the present invention based on the knowledge of one skilled in the art. It is to be noted that in the present specification and in the drawings, constituents having the same reference symbols mutually denote the same constituents.

(Embodiment 1)

Figure 8:
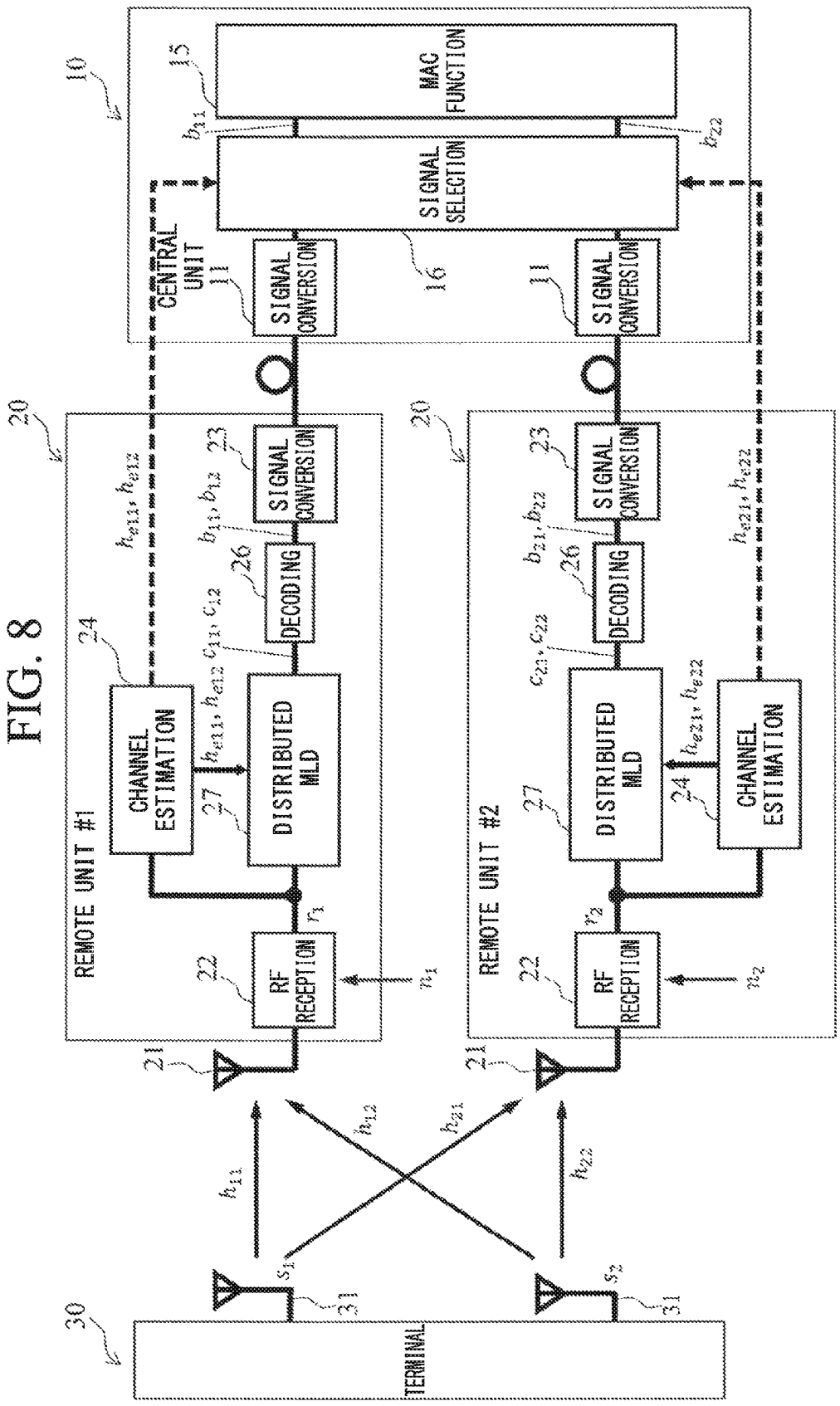
FIG. 8 shows an example of a wireless communication system in accordance with Embodiment 1.

FIG. 8 shows an example of a wireless communication system in accordance with Embodiment 1. The wireless communication system in accordance with the present embodiment is provided with a central unit 10 that functions as a central unit apparatus, remote units 20 that function as remote unit apparatuses, and a terminal 30 that functions as a wireless terminal. The terminal 30 performs CoMP signal transmission to the plurality of remote units 20.

The wireless communication system in accordance with the present embodiment has the terminal 30 (wireless terminal) provided with one or more antennas. As an example, FIG. 8 shows a case in which the number of wireless terminals is one and the number of antennas is two. The wireless communication system in accordance with the present embodiment is provided with one or more remote units 20 each provided with one or more antennas. As an example, FIG. 8 shows a case in which the number of antennas is one and the number of apparatuses is two. It is to be noted that in FIG. 8, the number of the terminals 30 is one, the number of the antennas provided in each terminal 30 is two, the number of cooperating remote units 20 is two, and the number of antennas provided in each remote unit 20 is one. However, these numbers are not limited.

In the present embodiment, the remote unit 20 performs a receiving process using hard decision. The central unit 10 is provided with signal conversion units 11 that function as inter-unit receiving units, a signal selection unit 16, and a MAC function unit 15. Each remote unit 20 is provided with an antenna 21, an RF receiving unit 22, a channel estimation unit 24, a distributed MLD unit 27 that functions as a reception signal processing unit, a decoding unit 26, and a signal conversion unit 23 that functions as an inter-unit transmission unit. The terminal 30 is provided with a transmission function unit (not shown in figure) and antennas 31.

The communication method in accordance with the present embodiment performs a channel estimation step, a reception signal processing step, and a signal selection step, sequentially.

In the channel estimation step, the remote units 20 receive transmission signals $s_1$ and $s_2$, and use reception signals to estimate channel information between the antennas 31 and the antennas 21. In the present embodiment, the RF receiving unit 22 of the remote unit #1 receives the transmission signals $s_1$ and $s_2$ and outputs a reception signal $r_1$. The channel estimation unit 24 of the remote unit #1 uses the reception signal $r_1$ to estimate channel information $h_{e11}$ and $h_{e12}$. The RF receiving unit 22 of the remote unit #2 receives the transmission signals $s_1$ and $s_2$ and outputs a reception signal $r_2$. The channel estimation unit 24 of the remote unit #2 uses the reception signal $r_2$ to estimate channel information $h_{e21}$ and $h_{e22}$.

In the reception signal processing step, the remote units 20 detect the reception signals corresponding to the transmission signals by performing maximum likelihood decision on the reception signals using the estimated channel information, and decodes the detected signals. In the present embodiment, the distributed MLD unit 27 of the remote unit #1 detects a code word $c_{11}$ that corresponds to the transmission signal $s_1$ and a code word $c_{12}$ that corresponds to the transmission signal $s_2$, using a hard decision output as maximum likelihood decision. Then the decoding unit 26 of the remote unit #1 decodes the code words $c_{11}$ and $c_{12}$ into bit sequences $b_{11}$ and $b_{12}$. The distributed MLD unit 27 of the remote unit #2 detects a code word $c_{21}$ that corresponds to the transmission signal $s_1$ and a code word $c_{22}$ that corresponds to the transmission signal $s_2$, using a hard decision output as maximum likelihood decision. Then the decoding unit 26 of the remote unit #2 decodes the code words $c_{21}$ and $c_{22}$ into bit sequences $b_{21}$ and $b_{22}$.

In the signal selection step, the central unit 10 selects signals corresponding to the transmission signals $s_1$ and $s_2$ from the detected signals, using the channel information estimated by the remote units 20. In the present embodiment, the bit sequence $b_{11}$ that corresponds to the transmission signal $s_1$ and the bit sequence $b_{22}$ that corresponds to the transmission signal $s_2$ are selected from the bit sequences $b_{11}$, $b_{12}$, $b_{21}$, and $b_{22}$, using the channel information $h_{e11}$, $h_{e12}$, $h_{e21}$, and $h_{e22}$.

The transmission signals $s_1$ and $s_2$ transmitted from the terminal 30 undergo MIMO transmission expressed as Equation (1), the RF receiving unit 22 of the remote unit #1 receives the reception signal $r_1$ expressed as Equation (14) below, and the RF receiving unit 22 of the remote unit #2 receives $r_2$ expressed as Equation (15) below.

[Equation 14]

$$r_1 = h_{11}s_1 + h_{12}s_2 + n_1 \quad (14)$$

[Equation 15]

$$r_2 = h_{21}s_1 + h_{22}s_2 + n_2 \quad (15)$$

The channel estimation unit 24 of the remote unit #1 can estimate the channel information $h_{e11}$ and $h_{e12}$ using the reception signal $r_1$ based on Equation (14). As with the remote unit #1, the channel estimation unit 24 of the remote unit #2 can estimate the channel information $h_{e11}$ and $h_{e22}$ using the reception signal $r_2$ based on Equation (15). Specifically, a known signal sequence is inserted into the transmission signals $s_1$ and $s_2$, and differences from received signal sequences that have undergone channel variation due to wireless transmission are calculated, to thereby estimate the channel information.

Focusing on the remote unit #1, the distributed MLD unit 27 performs a distributed MLD process on the reception signal $r_1$. In the distributed MLD, if the transmission signals $s_1$ and $s_2$ are both modulated by means of BPSK, four transmission signal vector candidates $s_{c1}$, $s_{c2}$, $s_{c3}$, and $s_{c4}$ expressed as Equation (2) to Equation (5) are multiplied by a channel vector $h_{e1}$ which is estimated from the reception signal $r_1$ and is expressed as Equation (16) below, and reception replicas $r_{1c1}$, $r_{1c2}$, $r_{1c3}$, and $r_{1c4}$ expressed as Equation (17) to Equation (20) below are generated.

[Equation 16]

$$h_{e1} = [h_{e11} h_{e12}] \quad (16)$$

[Equation 17]

$$r_{1c1} = h_{e1}s_{c1} = h_{e11}e^{j0} + h_{e12}e^{j0} \quad (17)$$

[Equation 18]

$$r_{1c2} = h_{e1}s_{c2} = h_{e11}e^{j0} + h_{e12}e^{j\pi} \quad (18)$$

[Equation 19]

$$r_{1c3} = h_{e1}s_{c3} = h_{e11}e^{j\pi} + h_{e12}e^{j0} \quad (19)$$

[Equation 20]

$$r_{1c4} = h_{e1}s_{c4} = h_{e11}e^{j\pi} + h_{e12}e^{j\pi} \quad (20)$$

As with conventional MLD, squared Euclidean distances $E_1$, $E_2$, $E_3$, and $E_4$ between the reception replicas and the reception signal $r_1$ expressed as Equation (14) are calculated as Equation (21) to Equation (24) below, and the transmission signal vector candidate that corresponds to the reception replica with the minimum squared Euclidean distance is determined as an estimated transmission signal.

[Equation 21]

$$E_1 = \|r_1 - r_{1c1}\|^2 \quad (21)$$

[Equation 22]

$$E_2 = \|r_1 - r_{1c2}\|^2 \quad (22)$$

[Equation 23]

$$E_3 = \|r_1 - r_{1c3}\|^2 \quad (23)$$

[Equation 24]

$$E_4 = \|r_1 - r_{1c4}\|^2 \quad (24)$$

Through the above processing, the distributed MLD unit 27 of the remote unit #1 performs a receiving process using hard decision, and acquires code words $c_{11}$ and $c_{12}$ that correspond to the transmission signals $s_1$ and $s_2$. Specifically, a bit or bit sequence indicating a modulation symbol of the estimated transmission signal $s_1$ is obtained as $c_{11}$, and a bit or bit sequence indicating a modulation symbol of the estimated transmission signal $s_2$ is obtained as $c_{12}$. Then after having performed a decoding process of the code words $c_{11}$ and $c_{12}$ into bit sequences $b_{11}$ and $b_{12}$ in the decoding unit 26, they undergo signal conversion in the signal conversion unit 23, and are transmitted as the bit sequences $b_{11}$ and $b_{12}$ to the central unit 10. Examples of the decoding process include a technique in which transition of bits in the received bit sequences is observed, and the bit sequence with the highest probability of having been transmitted, is determined. Moreover, a similar process is performed in the remote unit #2. Here code words $c_{21}$ and $c_{22}$ are acquired through the distributed MLD process in the distributed MLD unit 27, a process in which the code words $c_{21}$ and $c_{22}$ are decoded into bit sequences $b_{21}$ and $b_{22}$ is performed in the decoding unit 26, and then they undergo signal conversion in the signal conversion unit 23 to be transmitted as the bit sequences $b_{21}$ and $b_{22}$ to the central unit 10.

In the central unit 10, two types of bit sequences that correspond to the transmission signals $s_1$ and $s_2$ are collected. Then, the signal selection unit 16 selects, from the two types of bit sequences corresponding to the transmission signals $s_1$ and $s_2$, signals that correspond to the transmission signals $s_1$ and $s_2$, and outputs, for example, the bit sequences $b_{11}$ and $b_{22}$ and discards the other signals. As a result, even if the transmission signals $s_1$ and $s_2$ are MIMO transmission signals as expressed as Equation (1), the reception signal can be detected for each transmission signal. The MAC function unit 15 performs a MAC process of the data link layer, using the bit sequences $b_{11}$ and $b_{22}$. The MAC process, for example, includes a process of requesting re-transmission of a signal that includes an error.

Here, the signal selection process selects the bit sequences with small propagation loss between the antennas based on propagation loss between the antennas obtained from the channel information, which is fedback from the channel estimation units 24 of the remote units 20. For example, $b_{11}$ and $b_{22}$ are selected. In this case, it corresponds to the process when: propagation loss between the antenna 31 which transmitted transmission signal $s_1$ and the antenna 21 which received the reception signal $r_1$ obtained from the channel information $h_{e11}$ is smaller than propagation loss between the antenna 31 which transmitted the transmission signal $s_1$ and the antenna 21 which received the reception signal $r_2$ obtained from the channel information $h_{e21}$; and propagation loss between the antenna 31 which transmitted the transmission signal $s_2$ and the antenna 21 which received the reception signal $r_2$ obtained from the channel information $h_{e22}$ is smaller than propagation loss between the antenna 31 which transmitted the transmission signal $s_2$ and the antenna 21 which received the reception signal $r_1$ obtained from the channel information $h_{e12}$. Depending on propagation loss, the bit sequences $b_{11}$ and $b_{12}$ received from the remote unit #1 may be both selected, and the bit sequences $b_{21}$ and $b_{22}$ received from the remote unit #2 may be both discarded.

It is to be noted that for the signal conversion in the signal conversion units 11 and the signal conversion units 23 used for signal transmission between the central unit 10 and the remote units 20, an existing interface may be used, or a unique interface may be used. Furthermore, after RF reception has been performed at each remote unit 20, a process for performing reception of multi-carrier signals such as those in OFDM on reception signals may be performed. Moreover, in the process of distributed MLD, the number of transmission signal vector candidates increases exponentially in accordance with the number of modulation levels and the number of transmission antennas, and thus a technique of reducing the amount of computation may be used in the process of the distributed MLD unit 27 at each remote unit 20.

(Embodiment 2)

Figure 9:
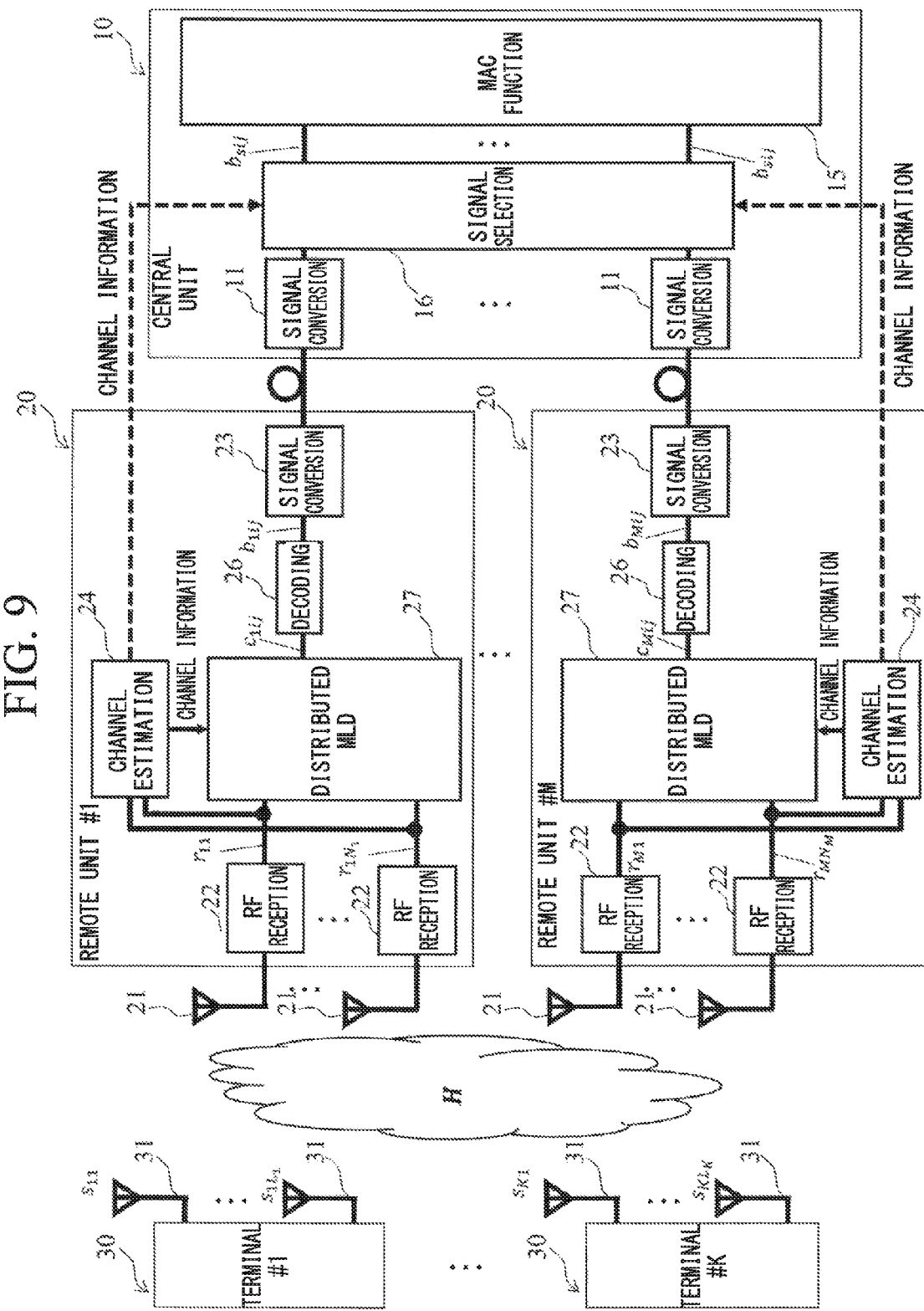
FIG. 9 shows an example of a wireless communication system in accordance with Embodiment 2.

In the case of using the technique of Embodiment 1, the number of terminals, the number of antennas of each terminal, the number of remote units, and the number of antennas of each remote unit may be set to arbitrary numbers, as will be described in Embodiment 2. FIG. 9 shows CoMP signal transmission in Embodiment 2. Here, the number of terminals is K, the number of antennas of terminals k (k is an integer from 1 to K) is $L_k$, the number of remote units is M, and the number of antennas of remote units m (m is an integer from 1 to M) is $N_m$. It is to be noted that the addition of noise in each RF receiving unit is omitted in FIG. 9.

The distributed MLD unit 27 of each remote unit 20 acquires code words that correspond to the transmission signals transmitted from all antennas 31 of all terminals 30, by means of a process similar to that of Embodiment 1. For example, $c_{1ij}$ (i is an integer from 1 to K, j is an integer from 1 to $L_i$) code words are acquired in the remote unit #1, and $c_{Mij}$ code words are acquired in the remote unit #M. These code words undergo a decoding process in the decoding units 26 where the code words $c_{1ij}$ and $c_{Mij}$ are decoded into bit sequences $b_{1ij}$ and $b_{Mij}$, subjected to signal conversion, and are transmitted to the central unit 10 as bit sequences $b_{1ij}$ and $b_{Mij}$.

Then, the signal selection unit 16 of the central unit 10 selects bit sequences $b_{sij}$ that correspond to the transmission signals based on the propagation loss between the antennas obtained from the channel information fedback from the channel estimation units 24, and outputs the selected bit sequences $b_{sij}$. When the number of terminals, the number of antennas of each terminal, the number of remote units, and the number of the antennas of each remote unit are arbitrary, values each obtained by adding propagation loss between a given antenna 31 of a given terminal 30 and all of the antennas 21 of each remote unit 20 are compared with one another, and a bit sequence delivered from the remote unit 20 with the minimum total propagation loss is selected, while all other bit sequences are discarded. A similar process is performed also for the other antennas.

It is to be noted that for the signal conversion in the signal conversion units 11 and the signal conversion units 23 used for signal transmission between the central unit 10 and the remote units 20, an existing interface may be used, or a unique interface may be used. Furthermore, after RF reception has been performed at each remote unit 20, a process for performing reception of multi-carrier signals such as those in OFDM on reception signals may be performed. Moreover, in the process of distributed MLD, the number of transmission signal vector candidates increases exponentially in accordance with the number of modulation levels and the number of transmission antennas, and thus a technique of reducing the amount of computation may be used in the process of the distributed MLD unit 27 at each remote unit 20. Furthermore, instead of distributed MLD, code words may be obtained using a process such as MMSE or SIC and hard decision demodulation.

(Embodiment 3)

Figure 10:
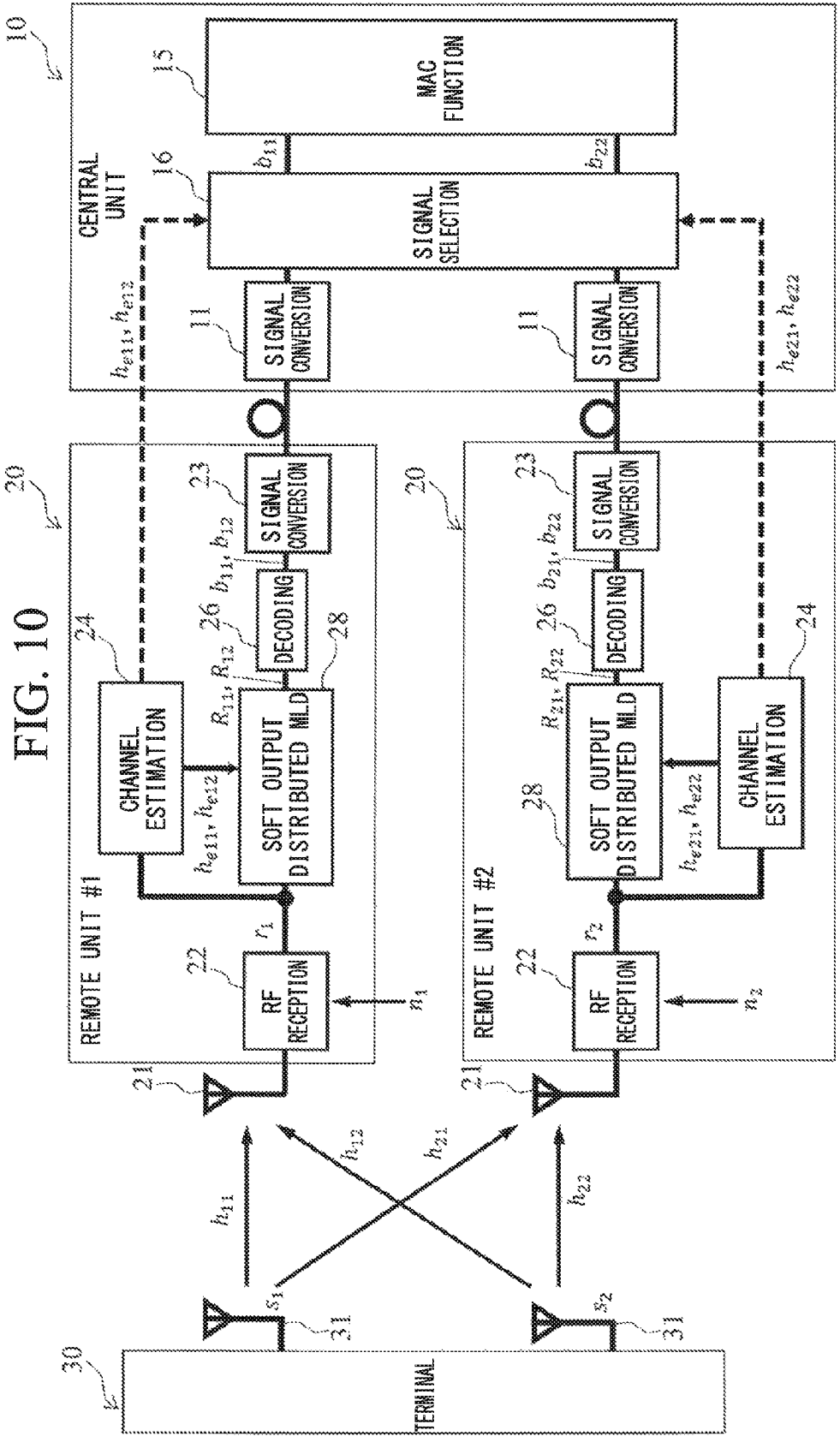
FIG. 10 shows an example of a wireless communication system in accordance with Embodiment 3.

In contrast with Embodiment 1, as will be described in Embodiment 3, likelihood for each bit of a transmission signal may be estimated by performing a receiving process using soft decision at each remote unit 20, and a bit sequence may be detected from the output likelihood information by means of a decoding process using a soft input decoder. FIG. 10 shows CoMP signal transmission in Embodiment 3. Each remote unit 20 is provided with an antenna 21, an RF receiving unit 22, a channel estimation unit 24, a soft output distributed MLD unit 28 that functions as a reception signal processing unit, a decoding unit 26, and a signal conversion unit 23 that functions as an inter-unit transmission unit.

In the reception signal processing step of a communication method in accordance with the present embodiment, the soft output distributed MLD unit 28 of the remote unit #1 detects log likelihood ratios $R_{11}$ of the bits corresponding to the transmission signal $s_1$ and log likelihood ratios $R_{12}$ of the bit corresponding to the transmission signal $s_2$, using a soft decision output as maximum likelihood decision. Then, the decoding unit 26 of the remote unit #1 decodes the log likelihood ratios $R_{11}$ and $R_{12}$ into bit sequences $b_{11}$ and $b_{12}$. The soft output distributed MLD unit 28 of the remote unit #2 detects log likelihood ratios $R_{21}$ of the bits corresponding to the transmission signal $s_1$ and log likelihood ratios $R_{22}$ of the bits corresponding to the transmission signal $s_2$, using a soft decision output as maximum likelihood decision. Then the decoding unit 26 of the remote unit #2 decodes the log likelihood ratios $R_{21}$ and $R_{22}$ into bit sequences $b_{21}$ and $b_{22}$.

The soft output distributed MLD unit 28 of the remote unit #1 outputs, as likelihood information, the log likelihood ratios $R_{11}$ and $R_{12}$ of the bits corresponding to the transmission signals $s_1$ and $s_2$, by means of a soft output distributed MLD process. Here, one example of a specific processing method of soft output MLD is such that the nearest reception replica having the minimum squared Euclidean distance from the reception signal is identified, and then a reception replica having the minimum squared Euclidean distance from the reception signal, among reception replicas corresponding to bit sequences obtained by inverting one of bits of a bit sequence that corresponds to the nearest reception replica, is identified. The squared Euclidean distances between the two identified reception replicas and the reception signal are calculated, and the difference therebetween is obtained as a log likelihood ratio.

The decoding unit 26 decodes the log likelihood ratios $R_{11}$ and $R_{12}$ into the bit sequences $b_{11}$ and $b_{12}$, using a soft decision input decoder such as a turbo decoder.

The signal conversion unit 23 transmits the bit sequences $b_{11}$ and $b_{12}$ to the central unit 10.

It is to be noted that when the number of modulation levels of a transmission signal increases, the number of bits that express the transmission signal also increases, and thus the number of log likelihood ratios also increases. For example, when the transmission signals $s_1$ and $s_2$ are both modulated by means of BPSK, the number of pieces of log likelihood ratio information becomes two as described above, whereas when they are modulated by means of QPSK, the total number of bits becomes 4 bits, and the number of pieces of log likelihood ratio information also becomes four. The decoding unit 26 of the remote unit #1 performs a soft input decoding process into the bit sequences $b_{11}$ and $b_{12}$, based on the acquired log likelihood ratios $R_{11}$ and $R_{12}$, and the output bit sequences $b_{11}$ and $b_{12}$ undergo signal conversion in the signal conversion unit 23 to be transmitted to the central unit 10. Moreover, a similar process is performed in the remote unit #2, and the log likelihood ratios $R_{21}$ and $R_{22}$ are acquired by means of a soft output distributed MLD process, a decoding process is performed based thereon, and the output bit sequences $b_{21}$ and $b_{22}$ undergo signal conversion to be transmitted to the central unit 10.

In the central unit 10, two types of bit sequences that correspond to the transmission signals $s_1$ and $s_2$ are collected, signals that correspond to the transmission signals $s_1$ and $s_2$ are selected from the two types of bit sequences based on the channel information fedback from the remote units 20, and, for example, $b_{11}$ and $b_{22}$ are output while all other signals are discarded. In this case, it corresponds to the process when: propagation loss between the antenna 31 which transmitted transmission signal $s_1$ and the antenna 21 which received the reception signal $r_1$ obtained from the channel information $h_{e11}$ is smaller than propagation loss between the antenna 31 which transmitted the transmission signal $s_1$ and the antenna 21 which received the reception signal $r_2$ obtained from the channel information $h_{e21}$; and propagation loss between the antenna 31 which transmitted the transmission signal $s_2$ and the antenna 21 which received the reception signal $r_2$ obtained from the channel information $h_{e22}$ is smaller than propagation loss between the antenna 31 which transmitted the transmission signal $s_2$ and the antenna 21 which received the reception signal $r_1$ obtained from the channel information $h_{e12}$. Depending on propagation loss, the bit sequences $b_{11}$ and $b_{12}$ received from the remote unit #1 may be both selected, and the bit sequences $b_{21}$ and $b_{22}$ received from the remote unit #2 may be both discarded.

It is to be noted that for the signal conversion used for signal transmission between the central unit 10 and the remote units 20, an existing interface may be used, or a unique interface may be used. Furthermore, after RF reception has been performed at each remote unit, a process for performing reception of multi-carrier signals such as those in OFDM on reception signals may be performed. Moreover, in the process of the soft output distributed MLD, the number of transmission signal vector candidates increases exponentially in accordance with the number of modulation levels and the number of transmission antennas, and thus a technique of reducing the amount of computation may be used in the process of the soft output distributed MLD at each remote unit.

(Embodiment 4)

Figure 11:
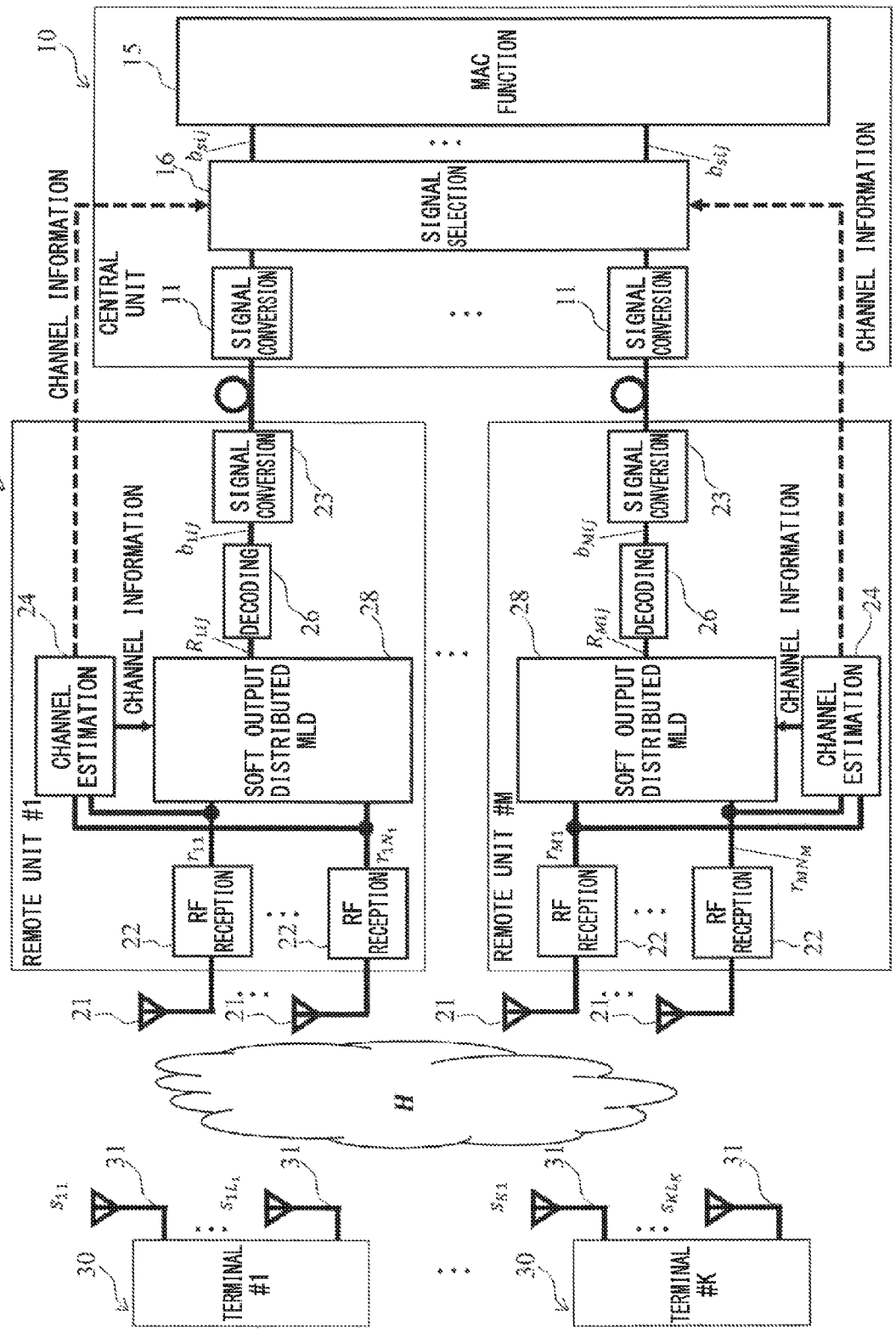
FIG. 11 shows an example of a wireless communication system in accordance with Embodiment 4.

In the case of using the technique of Embodiment 3, as will be described in Embodiment 4, the number of terminals, the number of antennas of each terminal, the number of remote units, and the number of antennas of each remote unit may be set to arbitrary numbers. FIG. 11 shows CoMP signal transmission in Embodiment 4. Here, the number of terminals is K, the number of antennas of terminals k (k is an integer from 1 to K) is $L_k$, the number of remote units is M, and the number of antennas of remote units m (m is an integer from 1 to M) is $N_m$. It is to be noted that the addition of noise in each RF receiving unit is omitted in FIG. 11.

In each remote unit 20, log likelihood ratios that correspond to the bits of the transmission signals transmitted from all of the antennas 31 of all of the terminals 30 are acquired by a soft output distributed MLD process of the soft output distributed MLD unit 28. For example, $R_{1ij}$ (i is an integer from 1 to K, j is an integer from 1 to $L_i$) log likelihood ratios are acquired in the remote unit #1, and $R_{Mij}$ pieces of information are acquired in the remote unit #M. The decoding units 26 perform a process of decoding into bit sequences $b_{1ij}$ to $b_{Mij}$, by means soft input decoders based on these log likelihood ratios. The bit sequences $b_{1ij}$ to $b_{Mij}$ output from the decoding units 26 undergo signal conversion in the signal conversion units 23, and are then transmitted to the central unit 10.

Then, the signal selection unit 16 of the central unit 10 selects a bit sequence $b_{stij}$ that corresponds to each transmission signal based on the channel information fedback from the channel estimation units 24, and outputs the selected bit sequence $b_{stij}$. When the number of terminals, the number of antennas of each terminal, the number of remote units, and the number of the antennas of each remote unit are arbitrary, values each obtained by adding propagation losses between a given antenna 31 of a given terminal 30 and all of the antennas 21 of each remote units 20 are compared with one another, and a bit sequence delivered from the remote unit 20 with the minimum total propagation loss is selected, while all other bit sequences are discarded. A similar process is performed also for the other antennas 31.

It is to be noted that for the signal conversion in the signal conversion units 11 and the signal conversion units 23 used for signal transmission between the central unit 10 and the remote units 20, an existing interface may be used, or a unique interface may be used. Furthermore, after RF reception has been performed at each remote unit 20, a process for performing reception of multi-carrier signals such as those in OFDM on reception signals may be performed. Moreover, in the process of the soft output distributed MLD, the number of transmission signal vector candidates increases exponentially in accordance with the number of modulation levels and the number of transmission antennas, and thus a technique of reducing the amount of computation may be used in the process of the soft output distributed MLD at each remote unit. Furthermore, instead of distributed MLD, log likelihood ratios may be obtained using a process such as MMSE or SIC and soft decision demodulation.

INDUSTRIAL APPLICABILITY

The present invention can be applied to the information communication industry.

DESCRIPTION OF REFERENCE SYMBOLS

10 Central unit
11 Signal conversion unit
12 Channel estimation unit
13 MIMO signal detection unit
14 Decoding unit
15 MAC function unit
16 Signal selection unit
20 Remote unit
21 Antenna
22 RF receiving unit
23 Signal conversion unit
24 Channel estimation unit
25 MIMO signal detection unit
26 Decoding unit
27 Distributed MLD unit
28 Soft output distributed MLD unit
30 Terminal
31 Antenna
91 Core network
92 Cell The invention claim is:

1. A base station apparatus comprising:
a plurality of remote unit apparatuses each comprising at least one antenna; and
a central unit apparatus connected to the plurality of remote unit apparatuses via a transmission path,
wherein each of all antennas provided in the plurality of remote unit apparatuses receives transmission signals wirelessly transmitted from all antennas provided in at least one wireless terminal each comprising at least one antenna, and
each of the plurality of remote unit apparatuses comprises:
a channel estimation unit that estimates channel information between all the antennas provided in the at least one wireless terminal and the at least one antenna provided in each of the plurality of remote unit apparatuses, using a reception signal received by the at least one antenna provided in each of the plurality of remote unit apparatuses;
a reception signal processing unit that detects reception signals corresponding to the transmission signals by performing maximum likelihood decision on the reception signal, using the channel information estimated by the channel estimation unit;
a decoding unit that performs decoding on the reception signals detected by the reception signal processing unit; and
an inter-unit transmission unit that transmits a signal obtained by the decoding in the decoding unit to the central unit apparatus, and
the central unit apparatus comprises:
an inter-unit receiving unit that receives signals each being transmitted from the inter-unit transmission unit provided in each of the plurality of remote unit apparatuses; and
a signal selection unit that acquires a plurality of pieces of channel information each being transmitted from the channel estimation unit provided in each of the plurality of remote unit apparatuses, and selects signals corresponding to the transmission signals, from among the signals received by the inter-unit receiving unit, based on the acquired plurality of pieces of channel information.

2. The base station apparatus according to claim 1, wherein in the maximum likelihood decision, the reception signal processing unit detects the reception signals using a hard decision output and outputs code words corresponding to the transmission signals, and
the decoding unit decodes the code words output from the reception signal processing unit into bit sequences.

3. The base station apparatus according to claim 2, wherein the signal selection unit obtains propagation losses between each of all the antennas provided in the at least one wireless terminal and all the antennas provided in the plurality of remote unit apparatuses based on the acquired plurality of pieces of channel information, and selects a signal corresponding to the minimum propagation loss from among the signals received by the inter-unit receiving unit.

4. A wireless communication system comprising:
the base station apparatus according to claim 3; and
the at least one wireless terminal.

5. A wireless communication system comprising:
the base station apparatus according to claim 2; and
the at least one wireless terminal.

6. The base station apparatus according to claim 1, wherein in the maximum likelihood decision, the reception signal processing unit detects the reception signals using a soft decision output and outputs log likelihood ratios of bits corresponding to the transmission signals, and
the decoding unit decodes the log likelihood ratios output from the reception signal processing unit into bit sequences.

7. The base station apparatus according to claim 6, wherein the signal selection unit obtains propagation losses between each of all the antennas provided in the at least one wireless terminal and all the antennas provided in the plurality of remote unite apparatuses based on the acquired plurality of pieces of channel information, and selects a signal corresponding to the minimum propagation loss from among the signals received by the inter-unit receiving unit.

8. A wireless communication system comprising:
the base station apparatus according to claim 7; and
the at least one wireless terminal.

9. A wireless communication system comprising:
the base station apparatus according to claim 6; and
the at least one wireless terminal.

10. The base station apparatus according to claim 1, wherein the signal selection unit obtains propagation losses between each of all the antennas provided in the at least one wireless terminal and all the antennas provided in the plurality of remote unit apparatuses based on the acquired plurality of pieces of channel information, and selects a signal corresponding to the minimum propagation loss from among the signals received by the inter-unit receiving unit.

11. A wireless communication system comprising:
the base station apparatus according to claim 10; and
the at least one wireless terminal.

12. A wireless communication system comprising:
the base station apparatus according to claim 1; and
the at least one wireless terminal.

13. A communication method in a base station apparatus comprising: a plurality of remote unit apparatuses each comprising at least one antenna; and a central unit apparatus connected to the plurality of remote unit apparatuses via a transmission path, the communication method comprising:

a channel estimation step in which, when each of all antennas provided in the plurality of remote unit apparatuses receives transmission signals that are wirelessly transmitted from all antennas provided in at least one wireless terminal each comprising at least one antenna, each of the plurality of the remote unit apparatuses uses a reception signal received by at least one antenna provided in each of the plurality of remote unit apparatuses to estimate channel information between all the antennas provided in the at least one wireless terminal and the at least one antenna provided in each of the plurality of remote unit apparatuses;

a reception signal processing step in which each of the plurality of remote unit apparatuses detects reception signals corresponding to the transmission signals by performing maximum likelihood decision on the reception signal using the estimated channel information, and decodes the detected signals; and a signal selection step in which the central unit apparatus selects, from detected signals, signals that corresponds to the transmission signals, using the estimated channel information.

14. The communication method according to claim 13, wherein in the reception signal processing step, as the maximum likelihood decision, each of the plurality of remote unit apparatuses detects code words that corresponds to the transmission signals using a hard decision output, and decodes the code word into bit sequences.

15. The communication method according to claim 13, wherein in the reception signal processing step, as the maximum likelihood decision, each of the plurality of remote unit apparatuses detects log likelihood ratios of bits corresponding to the transmission signals using a soft decision output, and decodes the log likelihood ratios into bit sequences.

* * * * *